United States Patent
Uenaka

(10) Patent No.: US 7,423,688 B2
(45) Date of Patent: Sep. 9, 2008

(54) LIGHTING CONTROL APPARATUS

(75) Inventor: Yukio Uenaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 846 days.

(21) Appl. No.: 11/016,974

(22) Filed: Dec. 21, 2004

(65) Prior Publication Data

US 2005/0134195 A1 Jun. 23, 2005

(30) Foreign Application Priority Data

Dec. 22, 2003 (JP) ............... 2003-424253

(51) Int. Cl.
*H04N 5/222* (2006.01)
(52) U.S. Cl. .................... 348/370
(58) Field of Classification Search ............ 348/226.1, 348/227.1, 228.1, 229.1, 361, 371, 372; 396/9, 396/11, 97, 276
See application file for complete search history.

(56) References Cited

U.S. PATENT DOCUMENTS

| 3,952,253 | A | * | 4/1976 | DeVolpi et al. ............ 327/160 |
| 4,928,277 | A | * | 5/1990 | Monma et al. ............ 369/116 |
| 6,584,283 | B2 | * | 6/2003 | Gabello et al. ............ 396/109 |
| 2002/0008694 | A1 | | 1/2002 | Miyachi et al. |

FOREIGN PATENT DOCUMENTS

| JP | 10-186059 | 7/1998 |
| JP | 2002-72166 | 3/2002 |
| JP | 2003-101836 | 4/2003 |

OTHER PUBLICATIONS

M. Okamura, "Revised Operational Amplifier Circuit Design", CQ Publishing Co., Ltd., together with an English language translation of the same, Dec. 1981.
H. Tsunoda, "Operational Amplifier Circuit and Analysis through Experimentation", Tokyo Denki University Press, together with an English language translation of the same, Dec. 1982.
U.S Appl. No. 11/016,726 to Uenaka et al., filed Dec. 21, 2004.
U.S. Appl. No. 11/016,906, to Uenaka, filed Dec. 21, 2004.

* cited by examiner

*Primary Examiner*—David Ometz
*Assistant Examiner*—Akshay Trehan
(74) *Attorney, Agent, or Firm*—Greenblum & Bernstein, P.L.C.

(57) ABSTRACT

A lighting control apparatus of a photographing apparatus, comprises a lighting-device, and a signal-supplying processor. The lighting-device illuminates a photographic subject by receiving one of a first rectangular wave signal and a second rectangular wave signal. The signal-supplying processor supplies the first rectangular wave signal when the length of an exposure time is less than a predetermined time, and supplies the second rectangular wave signal when the length of the exposure time is equal to or longer than a predetermined time. The first rectangular wave signal has an on state component during the exposure time, and an off state component outside the exposure time. The second rectangular wave signal has a predetermined rising time component when the off state is changed to the on state, and a predetermined falling time component when the on state is changed to the off state, in comparison with the first rectangular wave signal.

14 Claims, 6 Drawing Sheets

LIGHTING CONTROL APPARATUS

BACKGROUND OF THE INVENTION

1. Field of the Invention

The present invention relates to a lighting control apparatus for a photographing apparatus, and in particular to improvement of a lighting action during a long exposure operation.

2. Description of the Related Art

A lighting device which uses LEDs is proposed, in place of a lighting device which uses strobe radiation such as a xenon pipe which has been widely used with photographing apparatus, such as a camera. LEDs can be driven at a low voltage, and the circuit construction of the LED is simple.

When a rectangular wave signal is used to drive the illumination of the LED, the problem of the radio wave interference occurs because the high-frequency component is included in the rectangular wave signal.

Japanese unexamined patent publication (KOKAI) No. 2002-072166 discloses a controlling circuit which controls the output of signals, where the rectangular wave signal has a rising time and a falling time. Emission of light from the lighting source is gradually increased during the rising time, and emission of light from the lighting source is gradually decreased during the falling time, in order to restrain the high-frequency component of the rectangular wave signal, in the LCD display device.

However, when the above-discussed Japanese unexamined patent publication is applied to the lighting device for the photographing apparatus, an error of the light quantity due to the rising time and the falling time of the rectangular wave signal, occurs. The error of the light quantity influences the supply of light which is needed to illuminate the photographic subject.

SUMMARY OF THE INVENTION

Therefore, an object of the present invention is to provide an apparatus which restrains the high-frequency component of the rectangular wave signal, which drives the lighting device, by providing a rising time and a falling time for the rectangular wave form, when the influence of the rising and falling times does not substantially affect the accuracy of the light quantity needed for illuminating the photographic subject.

According to the present invention, a lighting control apparatus of a photographing apparatus, comprises a lighting device, and a signal supplying processor.

The lighting device illuminates a photographic subject by receiving one of a first rectangular wave signal and a second rectangular wave signal.

The signal supplying processor supplies the first rectangular wave signal to the lighting device when the length of an exposure time is less than a predetermined time, and supplies the second rectangular wave signal to the lighting device when the length is equal to or longer than a predetermined time.

The first rectangular wave signal has an on state component during the exposure time, and an off state component outside the exposure time.

The second rectangular wave signal has a predetermined rising time component when the off state is changed to the on state, and a predetermined falling time component when the on state is changed to the off state, in comparison with the first rectangular wave signal.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
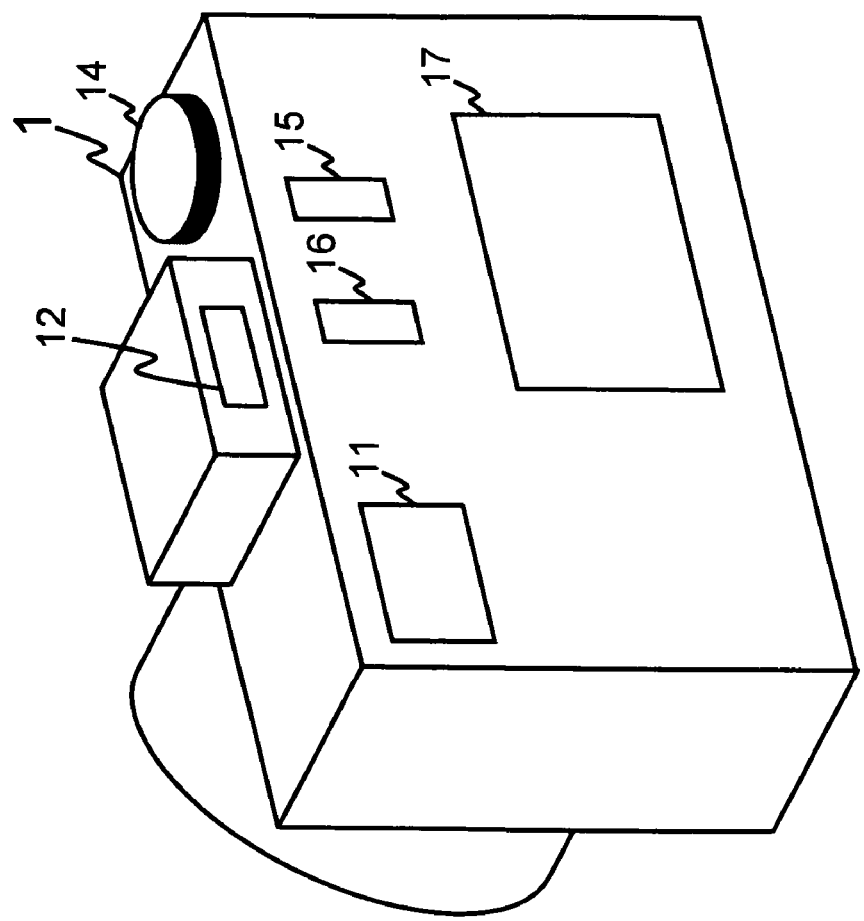
FIG. 1 is a perspective view of a photographing apparatus viewed from the back side of the photographing apparatus.
Figure 2:
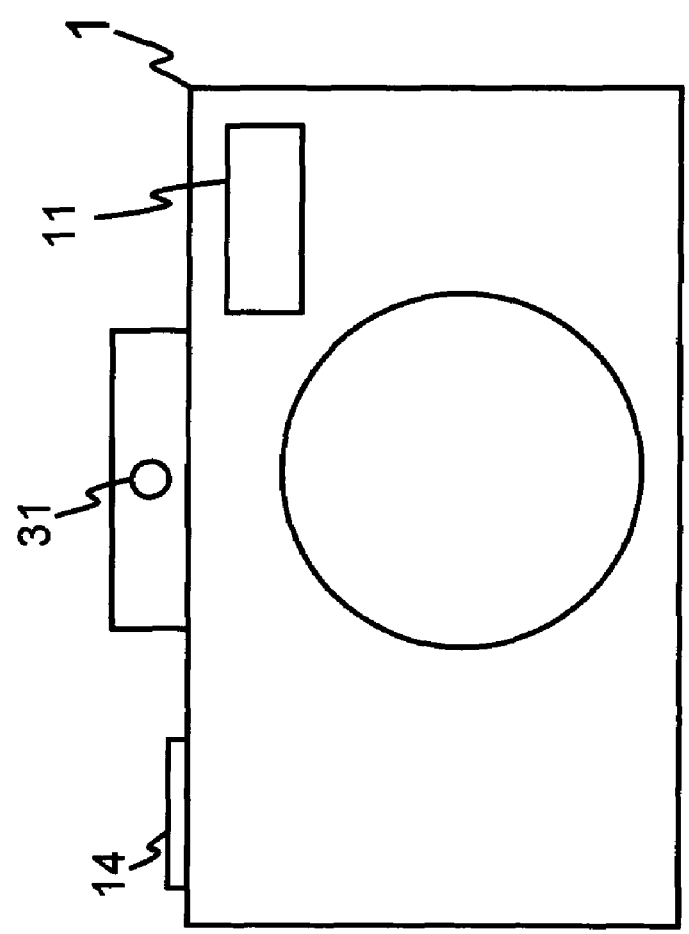
FIG. 2 is a front view of the photographing apparatus.
Figure 3:
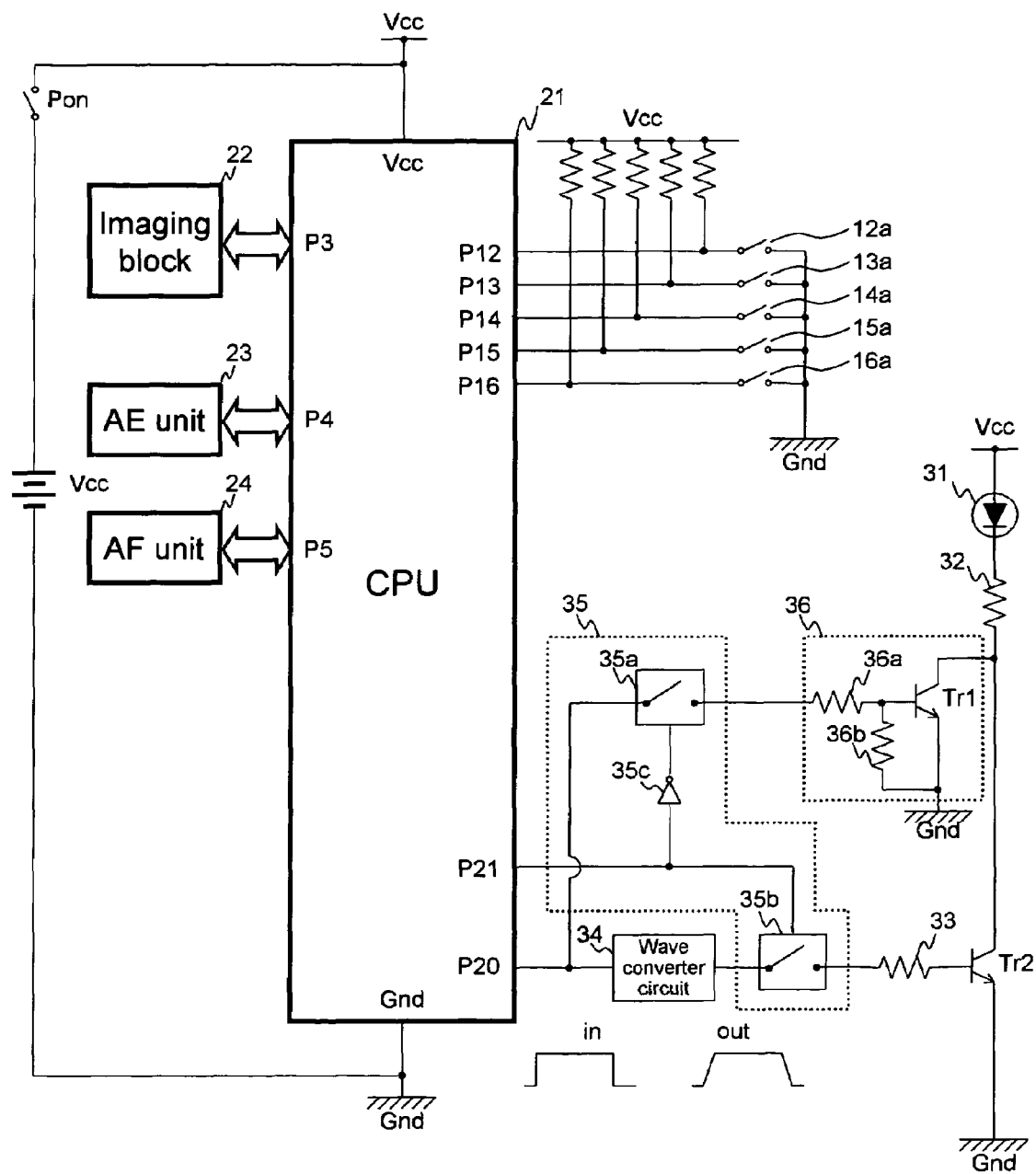
FIG. 3 is a circuit construction diagram of the photographing apparatus.
Figure 4:
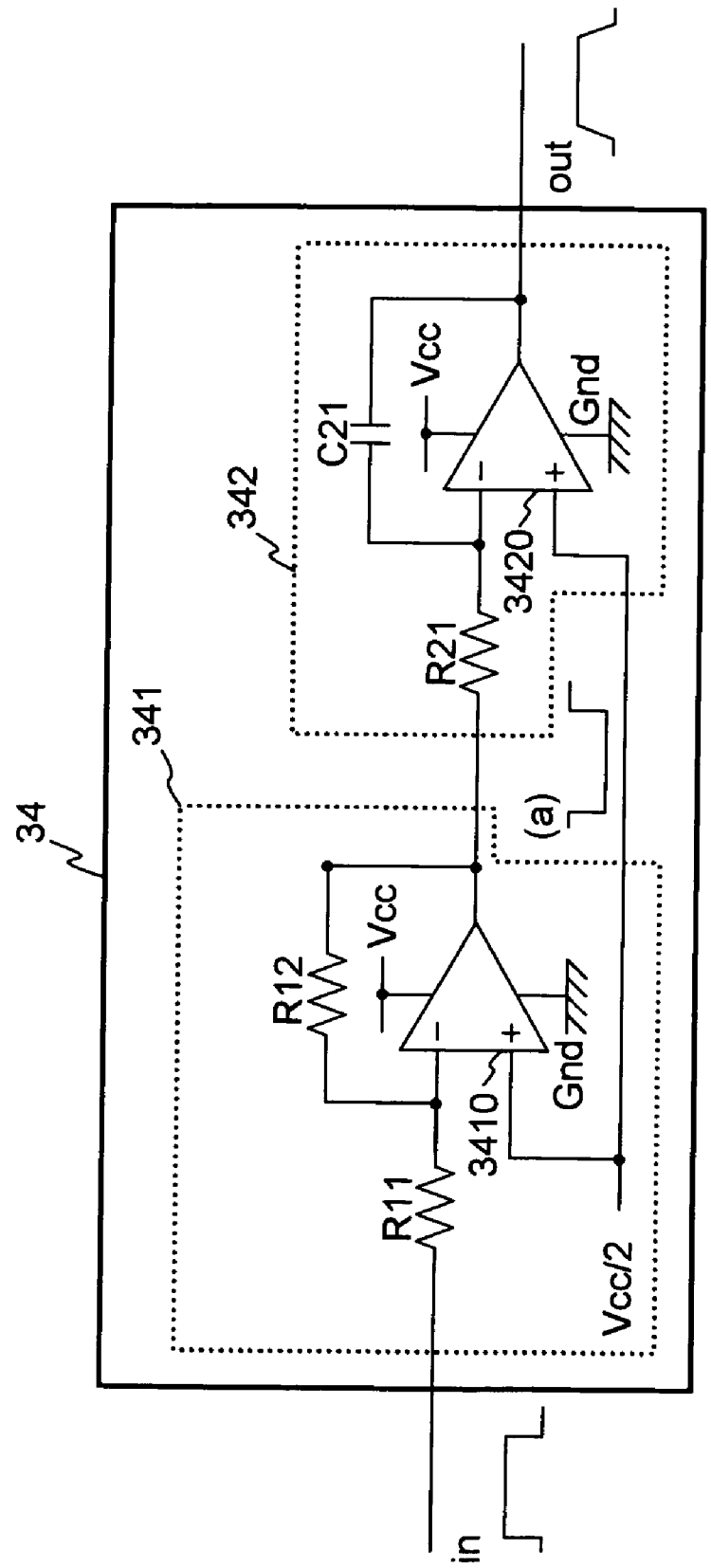
FIG. 4 is a circuit construction diagram of the wave converter circuit.

The present invention is described below with reference to this embodiment shown in the drawings. FIG. 1 shows a perspective view of a photographing apparatus 1 which comprises a lighting control unit, viewed from the back of the photographing apparatus 1. FIG. 2 is a front view of the photographing apparatus 1. In this embodiment, the photographing apparatus 1 is a digital camera.

The photographing apparatus 1 comprises an optical finder 11, an LED on button 12, an LED on switch 12a, a photometric switch 13a, a release button 14, a release switch 14a, a continuous shot button 15, a continuous shot switch 15a, a video button 16, a video switch 16a, an LCD monitor 17, an LED 31 for lighting, a current limiting resistor 32, a limiting resistor 33, a wave converter circuit 34, a signal switching unit 35, an illuminating circuit 36, and a transistor Tr2.

The photographing apparatus 1 comprises a CPU 21, an imaging block 22, an AE (automatic exposure) unit 23, and an AF (automatic focusing) unit 24. The imaging block 22 is composed of an imaging device such as a CCD etc. (which is not depicted). The AE unit 23 performs the photometric operation for the photographic subject, calculates the photometric values, and calculates the aperture value and the time length of the exposure time which is needed for the imaging, corresponding to the photometric values. The AF unit 24 performs the AF sensing operation, and performs the focusing operation which is needed for the imaging, corresponding to the result of the AF sensing operation.

The optical finder 11 is an apparatus which can be used to optically observe the photographic subject image. The photographic subject image can also be indicated on the LCD 17, as an image which is imaged by the imaging block 22.

When the LED on button 12 is pushed by the operator, the LED on switch 12a changes to the on state, so that the LED 31 is illuminated in the exposure time etc.

When the release button 14 is half pushed by the operator, the photometric switch 13a changes to the on state, so that the photometric operation, the AF sensing operation, and the focusing operation are performed.

When the release button 14 is fully pushed by the operator, the release switch 14a changes to the on state, so that the imaging operation is performed.

When the continuous shot button 15 is pushed by the operator, the continuous shot switch 15a changes to the on state, and a plurality of photographic subject images are continuously imaged, for example three frames per second, while the release switch 14a is in the on state. When the continuous shot switch 15a is in the on state, the photographing apparatus 1 is in a continuous shot mode.

When the video button 16 is pushed by the operator, the video switch 16a changes to the on state, so that the photographic subject image is imaged at a predetermined frame interval, and is stored as a moving picture, while the release switch 14a is in the on state. When the video switch 16a is in the on state, the photographing apparatus 1 is in a video mode.

The LED 31 is a lighting device which supplies a proper quantity of light to the photographic subject, to illuminate the photographic subject, during an exposure time, as an electric flash, in accordance with the exposure timing, when there is insufficient lighting of the photographic subject.

The LED 31 is driven in accordance with one of a first rectangular wave signal which is output from the CPU 21 and a second rectangular wave signal which is converted from the first rectangular wave signal by the wave converter circuit 34.

The first rectangular wave signal is a signal of which the on state component (the Hi signal) and the off state component (the Lo signal) are switched, having a pulse-amplitude Vcc. The Hi signal, which is the on state component of the first rectangular wave signal, is set during the exposure time with a predetermined voltage Vcc. The Lo signal, which is the off state component of the first rectangular wave signal, is set outside the exposure time.

The first rectangular wave signal has the on state component during the exposure time, and the off state component outside the exposure time.

Similarly, the second rectangular wave signal is a signal of which the on state component (the Hi signal) and the off state component (the Lo signal) are switched, having a pulse-amplitude Vcc. The Hi signal, which is the on state component of the second rectangular wave signal, is set during the exposure time with a predetermined voltage Vcc. The Lo signal, which is the off state component of the second rectangular wave signal, is set outside the exposure time.

The second rectangular wave signal has a predetermined rising time component when the off state is changed to the on state, and a predetermined falling time component when the on state is changed to the off state, in comparison with the first rectangular wave signal.

The first rectangular wave signal has a small rising time component which is a time lag from the off state to the on state, and has a small falling time component which is a time lag from the on state to the off state, so that the on state is instantaneously changed to the off state, and the off state is instantaneously changed to the on state. In other words, an inclination of a wave form of the first rectangular wave signal, when the on state is changed to the off state or when the off state is changed to the on state, is sharp (see the "In" wave form of FIG. 5).

Or, the time when the off state is changed to the on state in the first rectangular wave signal is shorter than the time when the off state is changed to the on state in the second rectangular wave signal.

Similarly, the time when the on state is changed to the off state in the first rectangular wave signal is shorter than the time when the on state is changed to the off state in the second rectangular wave signal.

Conversely, the second rectangular wave signal has a predetermined rising time component dd which is a time lag from the off state to the on state, and has a predetermined falling time component dd which is a time lag from the on state to the off state, so that the on state is not instantaneously changed to the off state, and the off state is not instantaneously changed to the on state. In other words, an inclination of a wave form of the second rectangular wave signal, when the on state is changed to the off state or when the off state is changed to the on state, is not sharp (see the "Out" wave form of FIG. 5).

Therefore, an on/off switching response of the first rectangular wave signal is faster than that of the second rectangular wave signal.

The first rectangular wave signal has a wave form where the off state (the Lo signal) is instantaneously changed to the on state (the Hi signal) having voltage Vcc, corresponding to the start of the exposure time, and the on state (the Hi signal) is instantaneously changed to the off state (the Lo signal), corresponding to the end of the exposure time.

The second rectangular wave signal has a wave form where the off state (the Lo signal) is changed to the on state (the Hi signal) having voltage Vcc, within the rising time component dd, corresponding to the start of the exposure time, and the on state (the Hi signal) is changed to the off state (the Lo signal), within the falling time component dd, corresponding to the end of the exposure time.

The second rectangular wave signal which is supplied to the LED 31, is obtained by converting the first rectangular wave signal in the wave converter circuit 34.

When the LED 31 is used, the port P20 of the CPU 21 outputs the first rectangular wave signal which has the on state component (the Hi signal) during the exposure time in which the imaging operation is performed, and the off state component (the Lo signal) outside the exposure time.

When the LED 31 is not used, the port P20 of the CPU 21 outputs the first rectangular wave signal which has only the off state component (the Lo signal).

Either the first rectangular wave signal or the second rectangular wave signal which is converted from the first rectangular wave signal, is supplied to the LED 31, through the current limiting resistor 32 etc., controlled by the signal switching unit 35 which is described later.

In this embodiment, whenever the LED on switch 12a is switched to the on state by the operator, the LED 31 is automatically illuminated in the exposure time, however the LED 31 may be automatically illuminated in the exposure time, according to the photometric value obtained from the photometric operation.

The radiation level of the LED 31 is synchronized with either the first rectangular wave signal or the second rectangular wave signal, during illumination. Specifically, the radiation level of the LED 31 has a rectangular wave form which has the same rising time and the same falling time as the first rectangular wave signal or the second rectangular wave signal. However, the radiation level of the LED 31 is based on characteristics of the LED 31 and the illuminating circuit 36, and a current amplification factor of the transistor Tr2.

The various output commands corresponding to the input signals of these switches are controlled by the CPU 21.

The information whether the LED on switch 12a is in the on state or in the off state, is input to a port P12 of the CPU 21 as a 1-bit digital signal. The information whether the photometric switch 13a is in the on state or in the off state, is input to a port P13 of the CPU 21 as a 1-bit digital signal. The information whether the release switch 14a is in the on state or in the off state, is input to a port P14 of the CPU 21 as a 1-bit digital signal. The information whether the continuous shot switch 15a is in the on state or in the off state, is input to a port P15 of the CPU 21 as a 1-bit digital signal. The information whether the video switch 16a is in the on state or in the off state, is input to a port P16 of the CPU 21 as a 1-bit digital signal.

The imaging block 22 is connected to a port P3 of the CPU 21 for inputting and outputting signals. The AE unit 23 is connected to a port P4 of the CPU 21 for inputting and outputting signals. The AF unit 24 is connected to a port P5 of the CPU 21 for inputting and outputting signals.

The port P20 of the CPU 21 is connected with the wave converter circuit 34 and the signal switching unit 35. The wave converter circuit 34 converts the first rectangular wave signal to the second rectangular wave signal. The signal switching unit 35 switches the signal which is supplied to the LED 31 for illuminating, to the first rectangular wave signal or the second rectangular wave signal.

The port P21 of the CPU 21 is connected with the signal switching unit 35.

The first rectangular wave signal is output from the port P20 of the CPU 21, so that the first rectangular wave signal which is input to the wave converter circuit 34, is converted to the second rectangular wave signal. One of the first rectangular wave signal and the second rectangular wave signal is supplied to the LED 31, according to the condition of the signal switching unit 35.

One of the Hi signal and the Lo signal is output from the port P21 of the CPU 21. When the Hi signal is output, the second rectangular wave signal is supplied to the LED 31. When the Lo signal is output, the first rectangular wave signal is supplied to the LED 31.

The first rectangular wave signal is input to the LED 31 passing through the first switch 35a of the signal switching unit 35, the illuminating circuit 36, and the limiting resistor 32. The second rectangular wave signal is input to the LED 31 passing through the second switch 35b of the signal switching unit 35, the current limiting resistor 33, the transistor Tr2, and the limiting resistor 32.

The switching of the Hi signal and the Lo signal which is output from the port P21 of the CPU 21, is performed corresponding to the length of the exposure time. When the length of the exposure time is shorter than a predetermined time T, the Lo signal is output from the port P21 of the CPU 21. When the length of the exposure time is equal to or longer than the time T, the Hi signal is output from the port P21 of the CPU 21. In this embodiment, the time T is set to ⅛ second which is desirable, however it is not limited ⅛ second.

The wave converter circuit 34 is composed of an inverting amplifier 341 and an integrating circuit 342.

Figure 5:
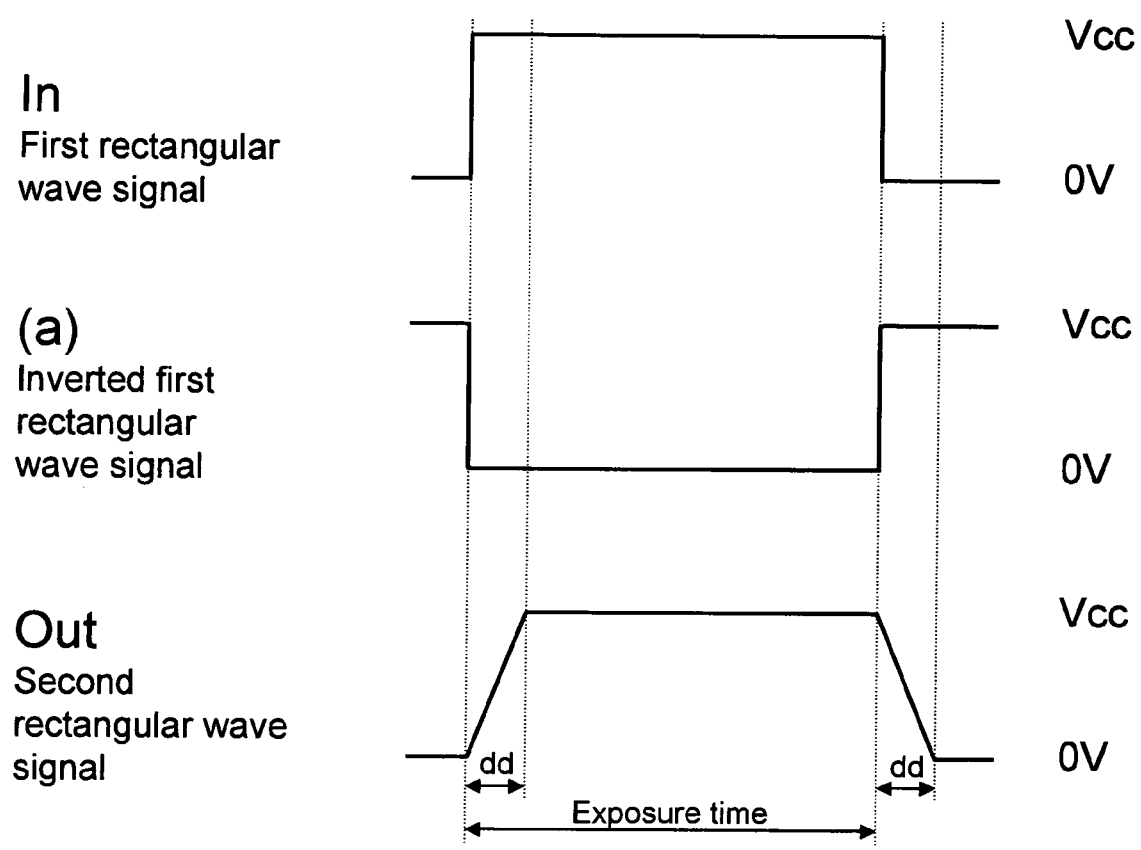
FIG. 5 shows the first rectangular wave signal, the inverted first rectangular wave signal, and the second rectangular wave signal.

The inverting amplifier 341 converts the first rectangular wave signal, which has the pulse-amplitude Vcc (see the "in" wave form of FIG. 5), to an inverted first rectangular wave signal, which has opposite phase to that of the first rectangular wave signal and has the pulse-amplitude Vcc (see the "(a)" wave form of FIG. 5). While the first rectangular wave signal is in the on state, the inverted first rectangular wave signal is in the off state. While the first rectangular wave signal is in the off state, the inverted first rectangular wave signal is in the on state.

The integrating circuit 342 converts the inverted first rectangular wave signal to the second rectangular wave signal, which has the rising time component dd and the falling time component dd (see the "out" wave form of FIG. 5).

The inverting amplifier 341 has a resistor R11, a resistor R12, and a first operational amplifier 3410. The first operational amplifier 3410 has an inverting input terminal, a non-inverting input terminal, and an output terminal. The first operational amplifier 3410 is supplied with power having voltage Vcc.

The inverting input terminal of the first operational amplifier 3410 has the first rectangular wave signal input thereto. The first rectangular wave signal is the input signal passing through the resistor R11, from the port 20 of the CPU 21. The non-inverting input terminal of the first operational amplifier 3410 is connected with the power supply whose voltage is ½ Vcc, and is connected with the non-inverting input terminal of the second operational amplifier 3420 in the integrating circuit 342 which is described later. The inverted first rectangular wave signal is output from the output terminal of the first operational amplifier 3410. The output terminal of the first operational amplifier 3410 is connected with the inverting input terminal of the first operational amplifier 3410 through the resistor R12. The output terminal of the first operational amplifier 3410 is connected with the inverting input terminal of the second operational amplifier 3420, through the resistor R21 in the integrating circuit 342 which is described later.

The integrating circuit 342 has a resistor R21, a capacitor C21, and a second operational amplifier 3420. The second operational amplifier 3420 has an inverting input terminal, a non-inverting input terminal, and an output terminal. The second operational amplifier 3420 is supplied with power having a voltage Vcc.

The inverting input terminal of the second operational amplifier 3420 has the inverted first rectangular wave signal input thereto. The inverted first rectangular wave signal is input through the resistor R21, from the output terminal of the first operational amplifier 3410. The non-inverting input terminal of the second operational amplifier 3420 is connected with the non-inverting input terminal of the first operational amplifier 3410 in the inverting amplifier 341. The second rectangular wave signal is output from the output terminal of the second operational amplifier 3420. The output terminal of the second operational amplifier 3420 is connected with the inverting input terminal of the second operational amplifier 3420 through the capacitor C21.

The signal switching unit 35 is composed of a first switch 35a, a second switch 35b, and an inverter 35c. The first switch 35a and the second switch 35b are the switches that switch to the on state corresponding to the Hi signal input, and that switch to the off state corresponding to the Lo signal input. The inverter 35c is an inverting circuit that outputs the Lo signal when the Hi signal is input to the inverter 35c, and that outputs the Hi signal when the Lo signal is input to the inverter 35c.

Accordingly, when the Lo signal is output from the port P21 of the CPU 21, the first switch 35a changes to the on state because the Hi signal is input to the first switch 35a from the inverter 35c. Therefore the first rectangular wave signal is output to the LED 31 through the illuminating circuit 36, and the limiting resistor 32.

When the Hi signal is output from the port P21 of the CPU 21, the second switch 35b changes to the on state because the Hi signal is input to the second switch 35b. Therefore the second rectangular wave signal is output to the LED 31 through the current limiting resistor 33, transistor Tr2, and the limiting resistor 32.

The illuminating circuit 36 is composed of a transistor Tr1, a first bias resistor 36a, and a second bias resistor 36b. The transistor Tr1 is an NPN transistor which performs the switching of the first rectangular wave signal which is supplied to the LED 31 in order to drive the LED 31, and whose base is connected to the CPU 21 through the first bias resistor 36a and the signal switching unit 35. The emitter of the transistor Tr1 is grounded, the collector of the transistor Tr1 is connected with the cathode of the LED 31 through the limiting resistor 32. The anode of the LED 31 is connected with the power supply whose voltage is Vcc. The second bias resistor 36b is connected between the base of the transistor Tr1 and the emitter of the transistor Tr1.

The transistor Tr2 is an NPN transistor for amplifying the second rectangular wave signal which is supplied to the LED 31, and whose base is connected to the CPU 21 through the current limiting resistor 33, the signal switching unit 35, and the wave converter circuit 34. The emitter of the transistor Tr2 is grounded, the collector of the transistor Tr2 is connected with the cathode of the LED 31 through the limiting resistor 32.

Accordingly, the CPU 21, the limiting resistor 32, the current limiting resistor 33, the wave converter circuit 34, the signal switching unit 35, the illuminating circuit 36, and the transistor Tr2 have a signal supplying function which supplies one of the first rectangular wave signal and the second rectangular wave signal to the LED 31, corresponding to the length of the exposure time.

When the release button 14 is half pushed, the photometric switch 13a is set to the on state, so that the port P13 receives the on state signal. The CPU 21 drives an AE sensor (which is not depicted) of the AE unit 23, so that the AE unit 23 performs the photometric operation, calculates the photometric value, and then calculates the aperture value and the exposure time, which are needed for imaging, corresponding to the photometric values. The CPU 21 drives a sensor (which is not depicted) of the AF unit 24, so that the AF unit 24 performs the AF sensing operation. Further a lens control circuit of the AF unit 24 (which is not depicted) is driven, and the focusing operation which is needed for imaging, is performed by moving the lens position in the light axis direction, corresponding to the result of the AF sensing operation.

When the release button 14 is fully pushed, the release switch 14a is set to the on state, so that the port 14 receives the on state signal. The CPU 21 performs the imaging operation, or the CPU 21 drives an aperture mechanism (which is not depicted) corresponding to the aperture value, drives a release of the shutter mechanism (which is not depicted) with a predetermined shutter speed, and then drives the imaging block 22 for the exposure.

When the LED on switch 12a and the release switch 14a are set to the on state, on state signals are input to the ports P12 and P14 (so that the CPU 21 outputs the Hi signal which forms the first rectangular wave signal from the port P20, and one of the Hi signal and the Lo signal from the port P21, in the exposure time).

When the length of the exposure time is equal to or longer than the predetermined time T (the long exposure), the Hi signal is output from the port P21 of the CPU 21. In this case, the second switch 35b is in the on state and the first switch 35a is in the off state, the second rectangular wave signal is supplied to the LED 31, through the second switch 35b.

When the length of the exposure time is less than the predetermined time T, the Lo signal is output from the port p21 of the CPU 21. In this case, the first switch 35a is in the on state and the second switch 35b is in the off state, the first rectangular wave signal is supplied to the LED 31, through the first switch 35a.

Accordingly, one of the first rectangular wave signal and the second rectangular wave signal illuminates the LED 31.

When the release switch 14a and the continuous shot switch 15a are set to the on state, on state signals are input to the ports P14 and P15. The imaging operation, controlled by the CPU 21, is continuously performed at a certain interval, while the release switch 14a is in the on state. In other words the release of the shutter mechanism is driven, the imaging block 22 is driven, and the exposure operation is performed. The certain interval are set in the photographing apparatus 1 by the operator, in order to take continuous still images, for example ⅓ second. Accordingly, the CPU 21 has a continuous shot control function which continuously performs a plurality of exposure operations of the photographic subject.

When the release switch 14a and the video switch 16a are set to the on state, on state signals are input to the ports P14 and P16. The imaging operation, controlled by the CPU 21, is continuously performed at predetermined intervals, while the release switch 14a is in the on state. In other words the release of the shutter mechanism is driven, the imaging block 22 is driven, and the exposure operation is performed. The predetermined intervals are set in the photographing apparatus 1 in advance, in order to take a video image, for example 1/60 second (which is equal to one frame period).

When the LED on switch 12a, the release switch 14a, and the continuous shot switch 15a are set to the on state, the Hi signal which forms the first rectangular wave signal is output from the port 20 of the CPU 21 during the exposure time, and one of the Hi signal and Lo signal is output from the port P21 of the CPU 21.

When the length of the exposure time is equal to or longer than the predetermined time T (the long exposure), the Hi signal is output from the port P21 of the CPU 21. In this case, the second switch 35b is in the on state and the first switch 35a is in the off state, the second rectangular wave signal is supplied to the LED 31, through the second switch 35b, similar to the case where the continuous shot switch 15a is not in the on state.

When the length of the exposure time is less than the predetermined time T, the Lo signal is output from the port p21 of the CPU 21. In this case, the first switch 35a is in the on state and the second switch 35b is in the off state, the first rectangular wave signal is supplied to the LED 31, through the first switch 35a, similar to the case where the continuous shot switch 15a is not in the on state.

The first rectangular wave signal, which is used for driving of the LED 31 when the length of the exposure time is less than the predetermined time T, is instantaneously changed from the on state having a predetermined voltage Vcc to the off state, and from the off state to the on state having a predetermined voltage Vcc, where the rising time component and the falling time component is short. Therefore the on/off switching response of the LED 31 is fast. Or, when the LED 31 is turned on, illumination of the LED 31 is instantaneously started. When the LED 31 is turned off, illumination of the LED 31 is instantaneously stopped.

Driving the LED 31 by using the first rectangular wave signal is suitable from the viewpoint of obtaining the predetermined light quantity in comparison with driving the LED 31 by using the second rectangular wave signal, when the photographing apparatus 1 illuminates the photographic subject as an electric flash in the exposure time.

However, driving the LED 31 by using the first rectangular wave signal, which includes the high-frequency component, causes noise in the power line, noise to be transmitted to the peripheral circuit, and rush current.

The second rectangular wave signal, which is used for driving the LED 31 when the length of the exposure time is equal to or longer than the predetermined time T, is changed from the on state having a predetermined voltage Vcc to the off state in the falling time component dd, and from the off state to the on state having a predetermined voltage Vcc in the rising time component dd. Therefore the on/off switching response of the LED 31 is slow. Or, when the LED 31 is turned on, illumination of the LED 31 is gradually increased over the rising time component dd. When the LED 31 is turned off, illumination of the LED 31 is gradually decreased over the falling time component dd.

Driving the LED 31 by using the second rectangular wave signal, which has the high-frequency component removed, reduces the influence of noise of the power line, noise to be transmitted to the peripheral circuit, and rush current, in comparison with driving the LED 31 by using the first rectangular wave signal.

Because a ratio of the rising time component dd and the falling time component dd to the exposure time in the long exposure operation is small, in other words an impact of the rising time dd and the falling time dd on the exposure time in the long exposure operation is small, the time lag for emitting light, which is equal to the rising time component dd and the falling time component dd, does not seriously influence the light quantity which needs to be supplied to the photographic subject.

When the LED on switch 12a, the release switch 14a, and the video switch 16a are set to the on state, the first rectangular wave signal is output from the port P20 of the CPU 21, during the exposure time, so that one of the Hi signal and the Lo signal is output from the port P21 of the CPU 21, similar to when the LED on switch 12a, the release switch 14a, and the continuous shot switch 15a are set to the on state.

Figure 6:
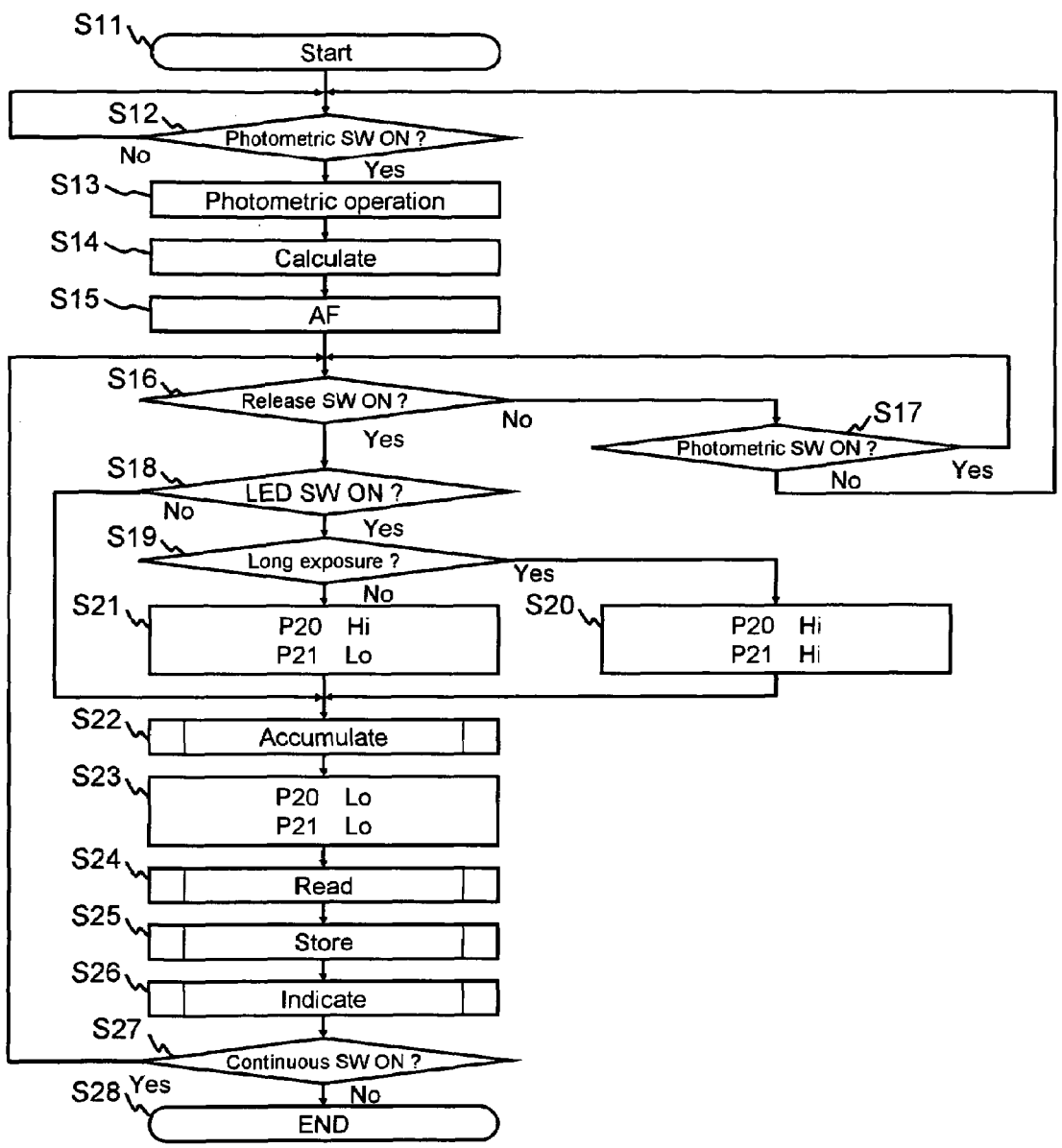
FIG. 6 is a flowchart of the LED illumination process in the exposure time, in the continuous shot mode.

Next, the control of the LED 31 in the exposure time and the post-exposure time, in the continuous shot mode (where the continuous shot switch 15a is in the on state), is explained by the flowchart in FIG. 6.

In step S11, the power supply of the photographing apparatus 1 is set to the on state. In step S12, it is judged whether the photometric switch 13a is set to the on state. When it is judged that the photometric switch 13a is not set to the on state, the process in step S12 is repeatedly carried out. When it is judged that the photometric switch 13a is set to the on state, the AE sensor of the AE unit 23 is driven in step S13, the photometric operation is performed, and the aperture value and the exposure time are calculated in step S14.

In step S15, the AF sensor of the AF unit 24 is driven, the AF sensing is performed, and the focusing operation is performed, by driving the lens control circuit of the AF unit 24. In this initial condition, shown in steps S11~ S15, the signal which is output from the port P21 of the CPU 21, is the Lo signal.

In step S16, it is judged whether the release switch 14a is set to the on state. When it is judged that the release switch 14a is not in the on state, it is judged whether the photometric switch 13a is set to the on state, in step S17. When it is judged that the photometric switch 13a is set to the on state in step S17, the flow is returned to step S16. When it is judged that the photometric switch 13a is not set to the on state in step S17, the flow is returned to step S12. When it is judged that the release switch 14a is set to the on state in step S16, it is judged whether the LED on switch 12a is set to the on state, in step S18.

When it is judged that the LED on switch 12a is in the on state, it is judged whether the length of the exposure time, which is obtained by the photometric calculation in step S14, is equal to or longer than the predetermined time T, in step S19.

When it is judged that the length of the exposure time is equal to or longer than the predetermined time T (long exposure), the Hi signal (the first rectangular wave signal) is output from the port P20 of the CPU 21, and the Hi signal is output from the port P21 of the CPU 21, in step S20. Therefore the exposure operation, in other words electric charge accumulation of the CCD, is performed under the condition where the second rectangular wave signal drives the illumination of the LED 31, in step S22.

When it is judged that the length of the exposure time is less than the predetermined time T (not a long exposure), the Hi signal (the first rectangular wave signal) is output from the port P20 of the CPU 21, and the Lo signal is output from the port P21 of the CPU 21, in step S21. Therefore, the exposure operation, in other words electric charge accumulation of the CCD, is performed under the condition where the first rectangular wave signal drives the illumination of the LED 31, in step S22.

When it is judged that the LED on switch 12a is not in the on state in step S18, the Lo signal is output from the ports P20 and P21 of the CPU 21. Therefore, the exposure operation, in other words electric charge accumulation of the CCD, is performed under the condition where the LED 31 is not illuminated in step S22 (without the through steps S20 and S21).

After the exposure time has passed, the signal, which is output from the port P21 of the CPU 21, is set to the Lo signal, in step S23. Or, the LED 31 is turned off.

In step S24, the electric charge which is accumulated in the CCD in the exposure time is read, so that, in step S25, the electric charge which is read, is stored in the memory of the photographing apparatus 1, as the image signal which was imaged by the imaging block 22. In step S26, the image signal which is stored, is indicated on the LCD monitor 17.

In step S27, it is judged whether the continuous shot switch 15a is in the on state. When it is judged that the continuous shot switch 15a is in the on state, the flow is returned to the step S16, so that the next exposure operation is performed. When it is judged that the continuous shot switch 15a is not in the on state in step S27, the control of the LED 31 in the exposure time, in the continuous shot mode (where the continuous shot switch 15a is in the on state), is finished in step S28.

Similarly, the control of the LED 31 in the exposure time, in the video mode (where the video switch 16a is in the on state), can be explained by using FIG. 6.

In this embodiment, it was explained that the lighting device depends on radiation from an LED, however the lighting device may depend on other radiation devices which are driven by the rectangular wave signal etc., and which illuminate a photographic subject.

In this embodiment, it was explained that the photographing apparatus 1 is a digital camera, however the photographing apparatus 1 may be a film camera.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2003-424253 (filed on Dec. 22, 2003), which is expressly incorporated herein by reference, in its entirety.

The invention claimed is:

1. A lighting control apparatus of a photographing apparatus, comprising:
    a lighting device that illuminates a photographic subject by receiving one of a first rectangular wave signal and a second rectangular wave signal; and
    a signal supplying processor that supplies said first rectangular wave signal to said lighting device when the length of an exposure time is less than a predetermined time, and that supplies said second rectangular wave signal to said lighting device when said length is equal to or longer than said predetermined time;

said first rectangular wave signal having the on state component during said exposure time, and the off state component outside said exposure time; and said second rectangular wave signal having a predetermined rising time component when the off state is changed to the on state, and a predetermined falling time component when the on state is changed to the off state, the second rectangular wave signal being different in comparison with said first rectangular wave signal.

2. The lighting control apparatus according to claim 1, wherein an on/off switching response of said first rectangular wave signal is faster than that of said second rectangular wave signal.

3. The lighting control apparatus according to claim 1, wherein said on state of said first rectangular wave signal has a predetermined voltage.

4. The lighting control apparatus according to claim 1, wherein said signal supplying processor has a rectangular wave signal outputting processor, a wave converting processor, and a signal switching unit;

said rectangular wave signal outputting processor outputs said first rectangular wave signal;

said wave converting processor converts said first rectangular wave signal to said second rectangular wave signal; and said signal switching unit supplies one of said first rectangular wave signal and said second rectangular wave signal, to be received, to said lighting device.

5. The lighting control apparatus according to claim 4, wherein said wave converting processor has an inverting amplifier which converts said first rectangular wave signal to an inverted first rectangular wave signal which has an opposite phase to that of said first rectangular wave signal, and an integrating circuit which converts said inverted first rectangular wave signal to said second rectangular wave signal.

6. The lighting control apparatus according to claim 5, wherein said inverting amplifier has a first operational amplifier, and said integrating circuit has a second operational amplifier;

an output terminal of said first operational amplifier is connected with an inverting input terminal of said second operational amplifier; and a non-inverting input terminal of said first operational amplifier is connected with a non-inverting input terminal of said second operational amplifier.

7. The lighting control apparatus according to claim 4, wherein said signal switching unit has an amplifying unit and a switching unit;

said amplifying unit amplifies said second rectangular wave signal and has a transistor for amplifying; and said switching unit has a transistor which performs the switching of said first rectangular wave signal in order to drive said lighting device.

8. The lighting control apparatus according to claim 1, wherein said predetermined time is 1/8 second.

9. The lighting control apparatus according to claim 1, wherein said lighting device is an LED.

10. The lighting control apparatus according to claim 1, wherein the radiation level of said lighting device is synchronized with one of a first rectangular wave signal and a second rectangular wave signal to be received, during illumination.

11. The lighting control apparatus according to claim 1, wherein said lighting device is used as an electric flash.

12. A lighting control apparatus of a photographing apparatus, comprising:

a lighting device that illuminates a photographic subject by receiving one of a first rectangular wave signal and a second rectangular wave signal; and a signal supplying processor that supplies said first rectangular wave signal to said lighting device when the length of an exposure time is less than a predetermined time, and that supplies said second rectangular wave signal to said lighting device when said length is equal to or longer than said predetermined time;

said first rectangular wave signal having the on state component during said exposure time, and the off state component outside said exposure time; and said second rectangular wave signal being similar to said first rectangular wave signal, other than said second rectangular wave signal has a predetermined rising time component when the off state is changed to the on state, and a predetermined falling time component when the on state is changed to the off state.

13. A lighting control apparatus of a photographing apparatus, comprising:

a lighting device that illuminates a photographic subject by receiving one of a first rectangular wave signal and a second rectangular wave signal; and a signal supplying processor that supplies said first rectangular wave signal to said lighting device when the length of an exposure time is less than a predetermined time, and that supplies said second rectangular wave signal to said lighting device when said length is equal to or longer than said predetermined time;

said first rectangular wave signal and said second rectangular wave signal having on state components during said exposure time, and off state components outside said exposure time; and a first time, when the off state is changed to the on state in said first rectangular wave signal, being shorter than a second time, when the off state is changed to the on state in said second rectangular wave signal.

14. A lighting control apparatus of a photographing apparatus, comprising:

a lighting device that illuminates a photographic subject by receiving one of a first rectangular wave signal and a second rectangular wave signal; and a signal supplying processor that supplies said first rectangular wave signal to said lighting device when the length of an exposure time is less than a predetermined time, and that supplies said second rectangular wave signal to said lighting device when said length is equal to or longer than said predetermined time;

said first rectangular wave signal and said second rectangular wave signal having on state components during said exposure time, and off state components outside said exposure time; and a first inclination of a wave form of said first rectangular wave signal being sharper than a second inclination of a wave form of said second rectangular wave signal.

* * * * *